Oct. 8, 1968  H. W. E. SCHLITT  3,404,571
INERTIAL GUIDANCE SYSTEM

Filed Dec. 20, 1963  8 Sheets-Sheet 1

INVENTOR.
HELMUT W. E. SCHLITT
BY
Beau, Brooks, Buckley & Beau,
ATTORNEYS

POWER DENSITY SPECTRA-VERTICAL OUTPUT AXIS

Oct. 8, 1968  H. W. E. SCHLITT  3,404,571
INERTIAL GUIDANCE SYSTEM
Filed Dec. 20, 1963  8 Sheets-Sheet 4

INVENTOR.
HELMUT W. E. SCHLITT
BY
Beau, Brooks, Buckley, & Beau,
ATTORNEYS

Oct. 8, 1968     H. W. E. SCHLITT     3,404,571
INERTIAL GUIDANCE SYSTEM

Filed Dec. 20, 1963     8 Sheets-Sheet 6

TRANSFER CHARACTERISTIC OF H-MODULATION SYSTEM AS A FUNCTION OF THE EXPONENT OF THE MODULATION FUNCTION

F<sub>IG.</sub> 6

INVENTOR.
HELMUT W. E. SCHLITT
BY
Beau, Brooks, Buckley, + Beau,
ATTORNEYS

INVENTOR.
HELMUT W. E. SCHLITT

INVENTOR.
HELMUT W. E. SCHLITT

United States Patent Office 3,404,571
Patented Oct. 8, 1968

3,404,571
INERTIAL GUIDANCE SYSTEM
Helmut W. E. Schlitt, Williamsville, N.Y., assignor to
Bell Aerospace Corporation
Filed Dec. 20, 1963, Ser. No. 332,091
9 Claims. (Cl. 74—5.34)

This invention relates to gyroscopically stabilized platform systems and pertains, more particularly, to advanced altitude reference instrumentation techniques involving platform stability accuracy achievements leading to material and significant advance in the inertial guidance field.

Although the gyroscopes used for platform stabilization are manufactured with extreme precision, their axes do not retain a fixed direction in space indefinitely, a slow drift or wander being inevitably present. Moreover, the rate of drift is of such low frequency that contemporary means of detection are totally incapable of detecting either the presence or the magnitude of such drift rates. This suggests a technique of programmed compensation or correction. However, even though drift rates of but a small fraction of a degree per hour can be achieved, the drift rate for given conditions of operation can only be stated in terms of average figures. That is to say, drift rates assume a random character which defies programmed compensation, and because the errors produced by drift increase steadily with time, such errors may be of significant consequence. As a result, this error situation may impose serious limitations on any inertial navigation system which must function, without correction, for substantial periods of time, even though the drift rate may have been reduced to such small value as is within the capabilities of the prior art. Obviously, any system which materially reduces the wander or drift will permit much greater accuracy so that the system may be operated, without correction, for much greater periods of time. Of principal concern in connection with this invention is the provision of an improved inertial navigation system which inherently provides such accuracy.

In my copending application Ser. No. 861,140 filed Dec. 21, 1959, and now U.S. Patent No. 3,176,524, there is disclosed a system wherein a gyroscope used to control a stable platform is subjected to a periodically variable angular momentum. In general, the effect of this variation of angular momentum is to cause the control gyroscope (and hence the stable platform) to precess, in the presence of drift, at the same frequency at which the angular momentum of the control gyroscope is varied and in which the magnitude of precession is related to the instantaneous magnitude of the drift. In this manner, the low frequency drift rate is made to manifest itself as a much higher frequency platform precession which may be readily detected, and thus compensated to reduce or eliminate drift. The present invention is related to this general procedure but is directed to certain improvements in the means for detection and in the processing circuitry associated therewith to effect compensation; all to the end of providing a system which virtually eliminates the effect of drift so that residual errors are reduced to such a small value as to render a substantial and significant increase in accuracy.

In a system as aforesaid, the error signal produced by random drift is rich in harmonic content and, as a result, in order to obtain a significant increase in accurate compensation, it would appear necessary to separately filter the most significant harmonics. As a practical matter, the number of significant harmonics is so great as to require a highly formidable filter system if a substantial increase in accuracy is to be obtained. In accord with the present invention, the acutal processing circuitry used employs a minimum number of operations which, at the same time account for all of the significant harmonics to an extent such that the resultant accuracy, even though the harmonics are not separately and individually filtered, is excellent. Moreover, the accuracy is of such degree as has never before been obtained. It is, therefore, an object of this invention to provide, in a system as described, an improved form of processing circuitry to achieve accurate compensation for gyro drift.

Essentially, the system according to the present invention embodies a closed loop servo system comprising a control gyro, a reference gyro and associated processing circuitry and feedback amplifiers; in which the angular momentum of the control gyro is periodically varied while the angular momentum of the reference gyro remains constant. The error signal resulting from the difference in angular output of the two gyros, and which is related to random drift as aforesaid, is used to slave the reference gyro, in the average, to the control gyro. At the same time, the error signal is processed and fed back to the control gyro to effect the corrective action. Furthermore, the processed error signal is modulated in a manner related to the modulation of the angular momentum of the control gyro, and fed back to the reference gyro so as to permit high gain in the processing circuitry, in the interest of accuracy, while at the same time, assuring a large enough error signal to provide good stability. Thus, in addition to being slaved in the average to the control gyro, the reference gyro is influenced in time-modulated fashion and in accord with the processed error signal, while the control gyro is influenced in accord with the processed error signal. With this arrangement, it is possible to effect a high degree of elimination of low frequency random drift.

More specifically, it is an object of this invention to provide an improved inertial guidance system of the type described wherein the angular momentum modulation function for the control gyro, the processing circuitry and the physical characteristics of the control gyro are so coordinated that the system will inherently provide for a residual drift rate in the order of not more than about $3 \times 10^{-5}$ degrees per hour.

Other objects and advantages of the invention will appear from the description hereinbelow and the accompanying drawing wherein.

Figure 1:
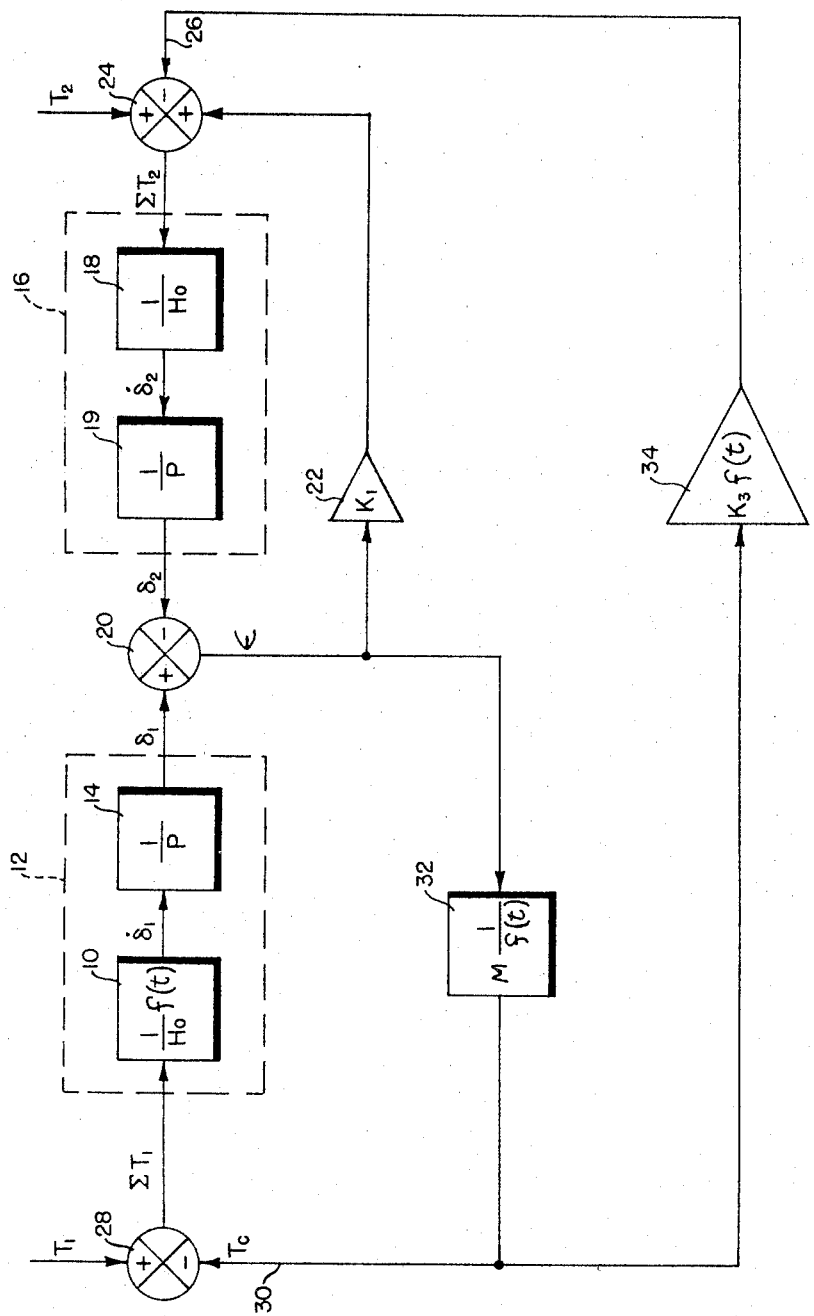
FIG. 1 is a servo diagram illustrating the principles of the present invention.

Referring now more particularly to FIG. 1, the system as shown therein represents one axis of an inertial navigation system constructed in accordance with the present invention. In FIG. 1, the block 10 illustrates the transfer function of a control gyroscope having its rotor varied in rotational speed so as to produce a time-variable angular momentum $$H_1 = \frac{1}{H_0} f(t)$$

where the expression $f(t)$ represents some time-variable function. In the presence of a drift-inducing torque $\Sigma T_1$ acting on the control gyro, the control gyro will precess at the same fundamental frequency at which it angular momentum is varied and in which the magnitude of precession is related to the instantaneous magnitude of the drift-inducing torque. This fact is evident from the basic expression.

$$\omega H = T$$

Where:
$\omega$ = precession rate
$H$ = angular momentum
$T$ = applied torque

Thus, in FIG. 1, the precession rate due to the drift-inducing torque $\Sigma T_1$ is designated by the character $\dot{\delta}_1$ where the dot denotes the first derivative with respect to time. The control gyro, which is shown diagrammatically as that portion enclosed by the dashed box 12, integrates the precession rate $\dot{\beta}_1$ as indicated by the integrator 14 denoting the inverse $p$ operator; the output of the control gyro 12 being the precession angle $\delta_1$ due to the drift-inducing torque $\Sigma T_1$. Although not shown in FIG. 1, the control gyro 12 is preferably used as a sensing device about its output axis for servo-controlling a stabilized platform. For complete stabilization of the platform, a pair of two-degree-of-freedom control gyros may be used. It will further be understood that the system of FIG. 1, utilizing a reference gyro hereinafter described, may be repeated for as many output axes of the control gyros as may be necessary to effect platform stabilization.

Thus, in FIG. 1, the precession angle $\delta_1$ is reflected by precession of the stabilized platform, not shown; which, in turn, imposes a drift-inducing torque $\Sigma T_2$ on the reference gyro 16. The rotor of the reference gyro is rotated at constant angular velocity as denoted by the transfer function $1/H_0$ ($H_0$ constant) represented by the box 18. The output due to this transfer function is the precession rate $\dot{\delta}_2$ for the gyro 16 and the integration performed by the integrator 19 produces the precession angle output $\delta_2$. The reference gyro 16 is a two-degree-of-freedom gyro having an output axis parallel with the output axis under consideration for the control gyro 12 so that the pick-off angle $\epsilon$ for the reference gyro is the difference between the two precession angles $\delta_1$ and $\delta_2$. This function which is inherent in the system described, is represented graphically by the summing circle 20 providing the pick-off angle output $\epsilon$. This angle provides the actuating error signal for the system, as will be evident hereinafter. It follows, from what is stated hereinabove, that for a platform stabilized about three axes, two control gyros would be required, each having two degrees of freedom, and a two-degree-of-freedom reference gyro would be required for each output axis of each control gyro.

As stated, the reference gyro is a two-degree-of-freedom gyro having its output axis parallel to the illustrated output axis of the control gyro 12; and in order to slave the reference gyro, in the average, to the control gyro so as to maintain this relationship, a feedback amplifier 22 having a gain $K_1$ is connected from the pick-off angle output $\epsilon$ to the torque means associated with the other output axis of the reference gyro. This illustrated graphically by the summing circuit 24 in FIG. 1, which summing circle is also used to designate the random drift-inducing torque $T_2$ associated with the output axis of the reference gyro as well as a torque-producing feedback signal 26 hereinafter more fully described. In other words, the previously mentioned drift-inducing torque $\Sigma T_2$ about the output axis of the reference gyro and which produces the precession angle $\delta_2$ is the algebraic sum of the random drift torque $T_2$; the torque supplied by the feedback amplifier; and the torque supplied by the feedback signal 26; all about that output axis of the reference gyro which tends to maintain its pick-off axis parallel with the pick-off axis of the control gyro.

A similar situation prevails for the control gyro 12 relative to the summing circle 28; the previously mentioned drift-inducing torque $\Sigma T_1$, about the illustrated output axis of the control gyro and which produces the precession angle $\delta_1$ for the platform is the algebraic sum of the random drift torque $T_1$ acting about the output axis of the control gyro and the corrective torque $T_c$ produced about the output axis by the corrective processing signal at 30.

It has been found that the actuating error signal, $\epsilon$, in a system employing varying angular momentum of the control gyro, is rich in harmonics. Of vital concern herein is the provision of processing circuit means having a transfer function which eliminates the necessity for a complex and cumbersome filter system which would otherwise be necessary to cope with the multitude of significant harmonics associated with the actuating error signal $\epsilon$. The processing circuit means 32 is shown, in FIG. 1, as having the transfer function $$M \frac{1}{f(t)}$$

although it will be understood that the transfer function does not actually take this form but is designated at this point by the simplified function so that an analysis of FIG. 1 will permit calculation of the signal levels at $\epsilon$. The function $$M \frac{1}{f(t)}$$

is such that at its output at 30, the torque of the control gyro 12 is correctly represented, magnified by a certain gain; and while this function does not produce the correct function for $T_2$ as it develops from the processing function, it yields a signal for $\Sigma T_1 = T_1 - T_c$ which corresponds accurately to the case in which the actual processing circuitry (hereinafter described) is used. Using the simplified processing function $$M \frac{1}{f(t)}$$

the contribution from $T_1$ to $T_c$ in FIG. 1 can be expressed as follows:

(1) $$T_{c_1} = T_1 \frac{1}{1 - K_3 + \frac{H_0}{M}}$$

From this, it can be seen that if $K_3$ is made equal to $H_0/H$, $T_c$ compensates $T_1$ exactly regardless of the gain $M$ and since $\epsilon$ is a function of $M$ and $T_c$ only, $M$ can be kept low enough to permit a reasonable signal level at $\epsilon$ to insure stability for the system.

Thus, the system as described will be seen to include the amplifier 34 which provides the modulated positive feedback function $$K_3 f(t) = \frac{H_0}{M} f(t)$$

for the purposes set forth. Further, from FIG. 1, the signal $\delta_1$ as a function of $T_1$ can be calculated as follows:

$$\delta_1 \left[ 1 + \frac{H_0}{M} - K_3 \right] = \frac{1}{H_0} \left[ \frac{H_0}{M} - K_3 \right] f(t) T_1$$

Since $K_3 = H_0/M$, the platform angle $\delta_1$ will be seen to be independent of $T_1$ and, based upon the nature of the equation, it appears that this is an instantaneous process that would occur without time delay. However, since the processing function $$M \frac{1}{f(t)}$$

is simplified with regard to the actual case, a minimum time delay in the compensation of the drift torque $T_1$ actually occurs. This is reflected in transient displacement of the platform that disappears in the steady state condition.

Figure 2:
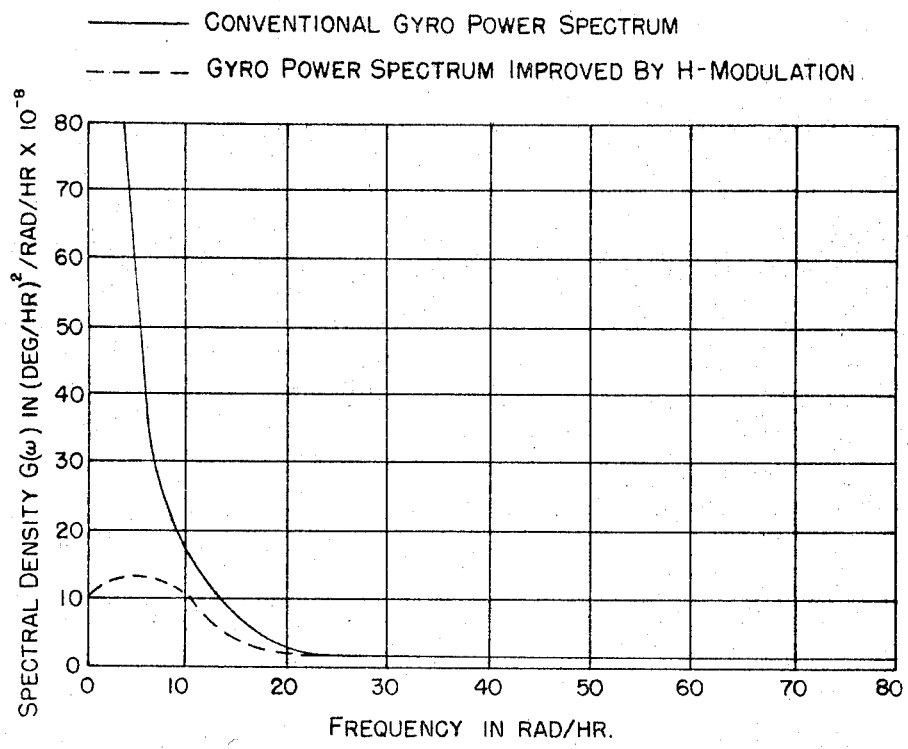
FIG. 2 is a graph illustrating the power density spectrum of a conventional gyro as compared to a gyro operating under the principles of the present invention.

Reference to FIG. 2 will illustrate the advantages in accuracy attained by the present system as compared to a conventional system according to prior art practice. For low frequencies, which is the area within which random drift occurs, it will be seen that the spectral density for conventional gyros is of significant magnitude whereas, with the present system, the spectral density is quite small. Thus, the response for the present system is excellent for the entire frequency spectrum.

Figure 3:
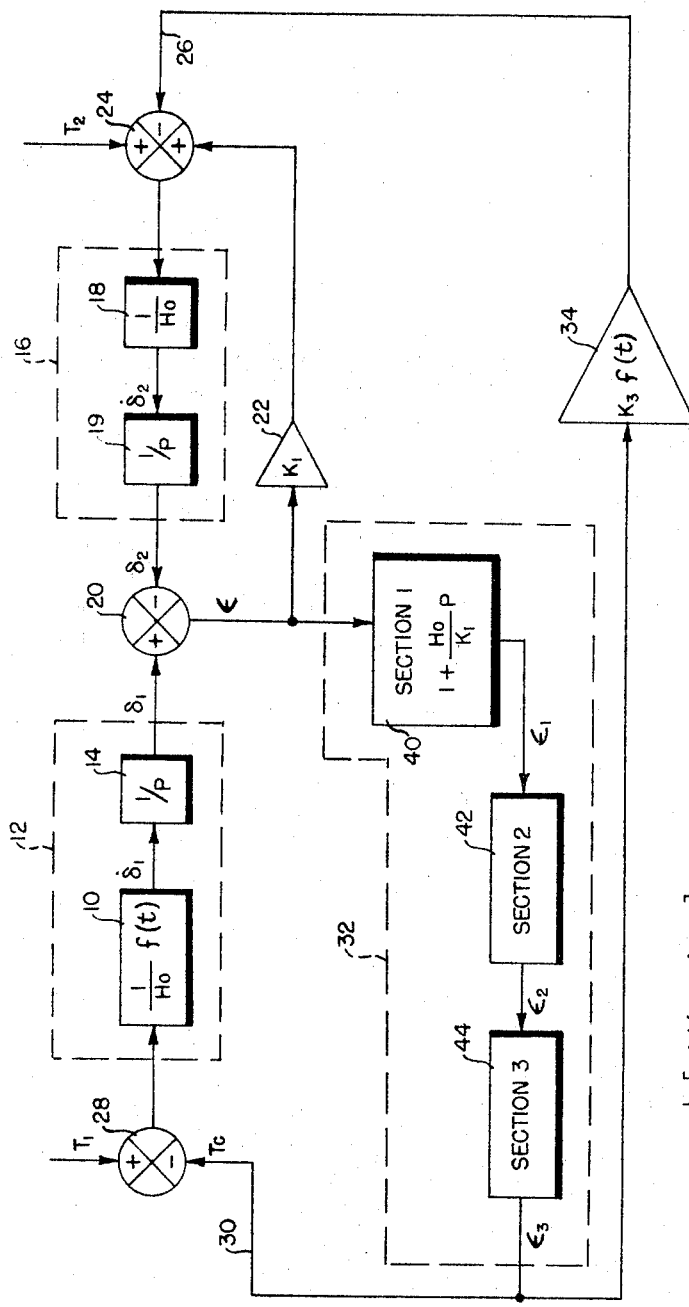
FIG. 3 is a servo diagram illustrating certain characteristics of the processing circuitry in accordance with the present invention.

With reference now to FIG. 3, the system shown therein is identical with that of FIG. 1 except that the processing circuitry 32 of FIG. 1 has been shown in greater detail in FIG. 3 to illustrate the actual transfer functions used. It will be seen that the processing circuitry is divided into three sections 40, 42 and 44 having respective outputs $\epsilon_1$, $\epsilon_2$, and $\epsilon_3$. Disregarding the positive feedback from the amplifier 34 and making no assumption as regards the nature of the processing circuitry 32, the reference gyro pick-off angle $\epsilon = \delta_1 - \delta_2$ can be calculated, from FIG. 3, as follows:

(2)
$$\delta_1 = (T_1 - T_c)\frac{1}{H_0}f(t)\cdot\frac{1}{p}$$

$$\delta_2 = (T_2 + \epsilon K_1)\frac{1}{H_0}\cdot\frac{1}{p}$$

$$\epsilon = \delta_1 - \delta_2 = (T_1 - T_c)\frac{1}{H_0}f(t)\cdot\frac{1}{p} - (T_2 + \epsilon K_1)\frac{1}{H_0}\cdot\frac{1}{p}$$

$$\epsilon + \frac{\epsilon K_1}{H_0 p} = (T_1 - T_c)\frac{f(t)}{H_0 p} - \frac{T_2}{H_0 p}$$

$$\epsilon\left(\frac{H_0 p + K_1}{H_0 p}\right) = (T_1 - T_c)\frac{ft}{H_0 p} - \frac{T_2}{H_0 p}$$

(3)
$$\epsilon = \frac{f(t)}{H_0 p + K_1}(T_1 - T_c) - \frac{1}{H_0 p + K_1}T_2$$

or, rearranging equation (3):

$$\epsilon = \frac{1}{H_0 p + K_1}[f(t)(T_1 - T_c) - T_2]$$

(4)
$$\epsilon = \frac{H_0}{p + \frac{K_1}{H_0}}[f(t)(T_1 - T_c) - T_2]$$

Equation 4 shows that the information $\epsilon$ for frequencies much lower than $K_1/H_0$ contains one term which is proportional to the total torque $T_1 - T_c = \epsilon T_1$ applied to the control gyro 12 multiplied by the modulation function $f(t)$, and another term which is proportional to $T_2$; and for frequencies much higher than $K_1/H_0$, the information $\epsilon$ is approximately proportional to the sum of the time integrals of these two torques $\Sigma T_1$ and $T_2$. Since $K_1/H_0$ cannot be selected to be much larger than about 300 radians per hour due to practical pick-off threshold limitations, the pick-off signal $\epsilon$ must be multiplied by the transfer function $$\left(1 + \frac{H_0}{K_1}p\right)$$

in order to eliminate all significant phase shifts of the frequency $\omega_1$ and its multiples; $\omega_1$ being the frequency of angular momentum modulation. This multiplication is performed in the first section 40 of the processing circuitry, as shown, resulting in the signal $$\epsilon_1 = \frac{1}{K_1}\left[f(t)(T_1 - T_c) - T_2\right]$$

remaining to be processed by the sections 42 and 44. As stated hereinbefore, variation of the angular momentum of the control gyro results in a signal $\epsilon$ which is rich in harmonics. I have found that, for a particular type of angular momentum modulation function hereinafter described, if the second section 42 of the processing circuitry is constructed so that its output $$\epsilon_2 = \frac{d\epsilon_1}{df(t)} + f(t)\frac{d^2\epsilon_1}{df(t)^2}$$

with certain computations of $d^2\epsilon_1/df(t)^2$ being omitted so that all second derivatives $[\ddot{f}(t)]$ of $f(t)$ disappear, the multitude of significant harmonics is accounted for without resort to complex and cumbersome processing circuitry. The above form of the output $\epsilon_2$ reduces, under this condition, to the following form where the single and double dots represent first and second derivatives with respect to time:

(5)
$$\epsilon_2 = \frac{1}{\dot{f}(t)}\left(\dot{\epsilon}_1 + \frac{f(t)}{\dot{f}(t)}\ddot{\epsilon}_1\right)$$

or, substituting the first and second derivatives of the output signal $\epsilon_1$, as above:

(6)
$$\epsilon_2 = \frac{1}{K_1}\left[(T_1 - T_c) + 3\frac{f(t)}{\dot{f}(t)}(\dot{T}_1 - \dot{T}_c) + \left[\frac{f(t)}{\dot{f}(t)}\right]^2(\ddot{T}_1 - \ddot{T}_c) - \frac{1}{\dot{f}(t)}\dot{T}_2 - \frac{f(t)}{\dot{f}(t)^2}\ddot{T}_2\right]$$

The third section 44 of the processing circuitry then computes $(T_1 - T_c)$ from the output $\epsilon_2$ so that its output $\epsilon_3$ appears as follows:

(7)
$$\left(\frac{f(t)}{\dot{f}(t)}\right)^2\ddot{\epsilon}_3 + \frac{3f(t)}{\dot{f}(t)}\dot{\epsilon}_3 + K_2 g(\omega)\dot{\epsilon}_3 + \epsilon_3 = K_1\epsilon_2$$

In the process of computing in the third section 44, a feedback term $K_2 g(\omega)$ is included which represents a selective damping of the transfer function. The reason for this is that Equation 7 represents a second order transfer function with a time-variable factor of $$\left(\frac{f(t)}{\dot{f}(t)}\right)^2$$

attached to the second derivative, indicating a variable natural frequency. Moreover, there is a damping term $$3\frac{f(t)}{\dot{f}(t)}$$

which will be positive over half a cycle of the modulation function $f(t)$ and negative over the remaining half cycle. As a result, in the absence of the selective damping term $K_2 g(\omega)$, the over-all damping of the transfer function would be zero so that any noise input of the average natural frequency $\omega_n$ would give rise to an oscillation at that frequency having a continuously growing amplitude. In order to prevent this, the feedback term $K_2 g(\omega)$ is added which changes the transfer function only in the neighborhood of the natural frequency $\omega_n$ and is otherwise of no effect on the frequency characteristics of the transfer function. As long as the power spectrum of $(T_1 - T_c)$ has only a small amplitude at the natural frequency $\omega_n$ the elimination of this portion in the transfer function of the section 44 is of minor consequence.

Figure 5:
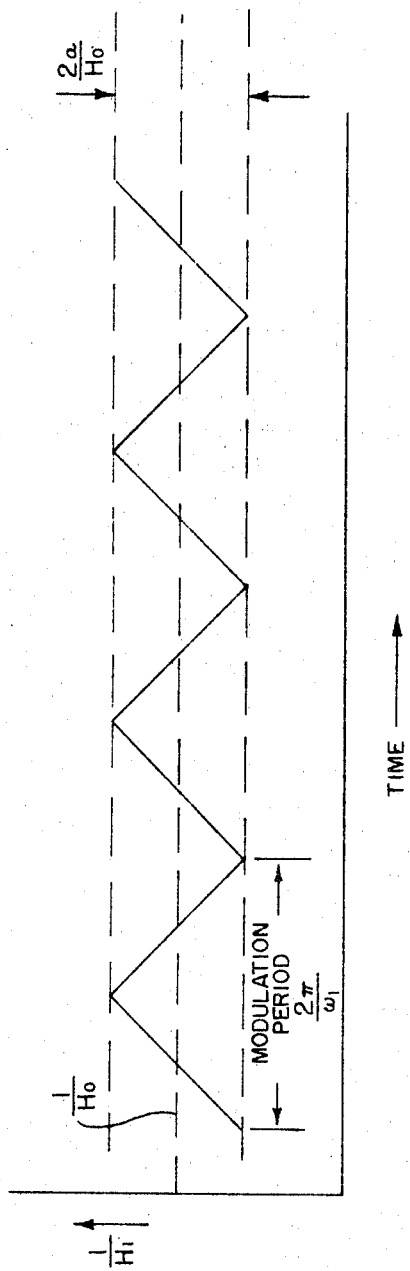
FIG. 5 is a waveform illustrating the angular momentum modulating function for the control gyro.

To better illustrate the significance of the above equations and characteristics, reference is had to FIG. 5 which shows the waveform of the modulation function $f(t)$. It will be noticed that this waveform is triangular so that the time derivative $\dot{f}(t)$ is constant and changes periodically from a positive to a negative value, and vice versa; each such change occurring within an infinitely short time. Consequently, the second time derivative $\ddot{f}(t)$ remains zero throughout the modulation cycle except for these infinitely short periods, at which points the value of $\ddot{f}(t)$ is either plus or minus infinity. These points occur at $$t = \frac{2n\pi}{\omega_1}$$

and $$t = \frac{(2n+1)\pi}{\omega_1}$$

and it is at these points, in the processing circuit section 42, that the computations of $$\frac{d^2\epsilon_1}{df(t)^2}$$

are omitted so that all second derivatives $\ddot{f}(t)$ of $f(t)$ disappears at these points. Thus, as is shown in detail in FIG. 4, the differentiator 50 is so constructed as to omit the second differentiation of $\epsilon_1$ with respect to time at the times $$t = \frac{2n\pi}{1}$$

and $$t = \frac{(2n+1)\pi}{1}$$

This effect being denoted by the bar over the differential operator $p$. The signal $\epsilon_1$ from the first section of the processing circuitry is differentiated by the differentiator 52 whose output is applied both to the differentiator 50 and to the summing means 54. The signal output $\dot{\epsilon}_1$ of differentiator 50 is multiplied, at 56, by the term $\dot{f}(t)/\ddot{f}(t)$ and applied to the summing means 54. Lastly, the output of the summing means 54 is multiplied at 58 by the term $f(t)/\dot{f}(t)$ so that the output $\epsilon_2$ of the processing section 42 takes the form as in Equations 5 and 6.

Figure 4:
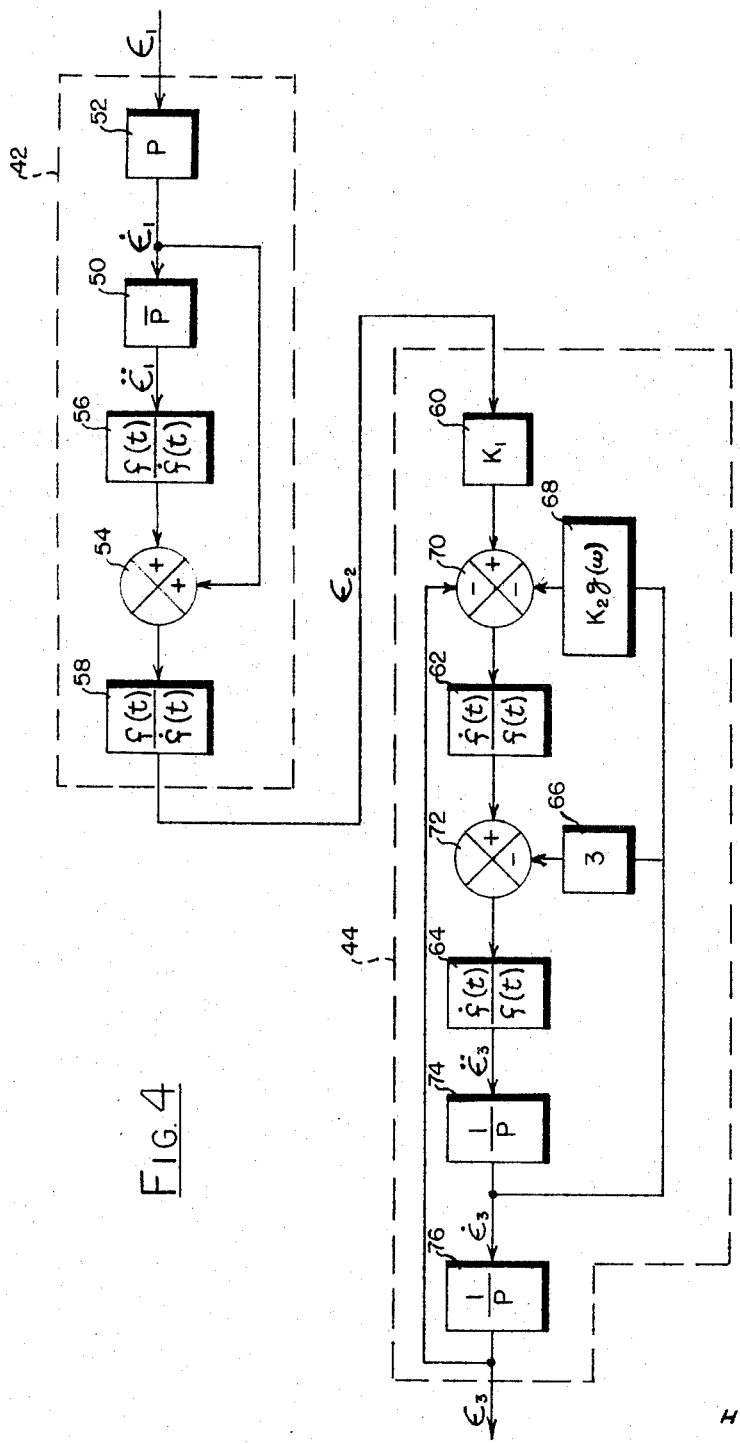
FIG. 4 is a block diagram illustrating certain portions of the processing circuitry shown in FIG. 3.

In the processing section 44, the multipliers 60, 62, 64, 66 and 68 perform the multiplications indicated in FIG. 4 whereas the summing means 70 and 72 and the integrators 74 and 76 are used to produce the requisite output signal $\epsilon_3$. It is to be noted that the selective damping term $K_2 g(\omega)$ is applied as a feedback $\epsilon_3 K_2 g(\omega)$ as shown; using a twin-T filter to separate the natural frequency $\omega_n$ and subtract this oscillation with proper phase shift from the input information to the processing section 44.

Figure 6:
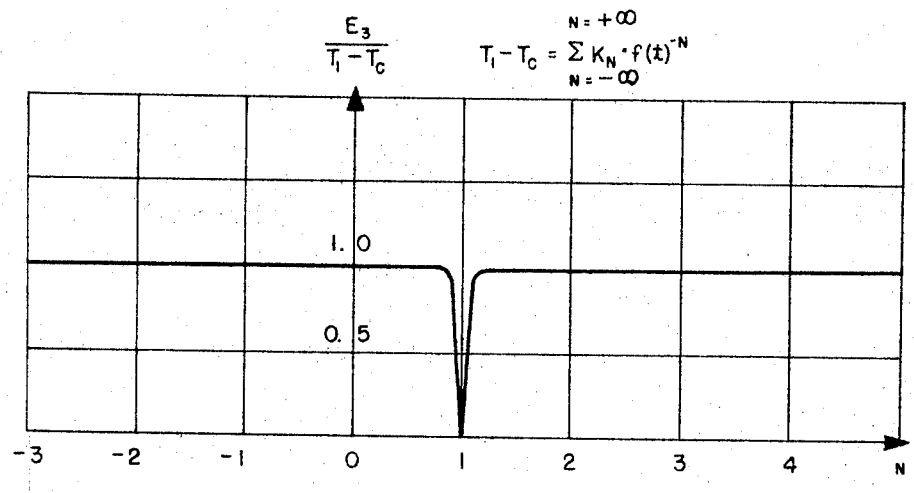
FIG. 6 is a diagram illustrating the transfer characteristic according to the present invention.

To better appreciate the significane of this selective damping term $K_2 g(\omega)$, reference is had to FIG. 6. In FIG. 6, the combination of the angular momentum-modulated transfer function of the control gyro 12 and the processing function can be expressed as a power series in $f(t)$. Thus, if the total torque $\Sigma T_1 = T_1 - T_c$ of the control gyro is expressed as:

$$T_1 - T_c = \sum_{n=-\infty}^{n=+\infty} K_n \cdot f(t)^{-n}$$

the corresponding transfer function is a function of $n$ as shown in FIG. 6. The width of the notch in the vicinity of $n=1$ is equivalent to the width of the twin-T feedback filter $g(\omega)$ in the section 44 of the processing circuitry. The case of $n=1$ is equivalent to torques which change proportionally to the angular momentum of the control gyro, that is to say, to torques which vary linearly with the angular momentum $$\frac{1}{H_0} f(t)$$

of the control gyro. Obviously, then, successful instrumentation of the present system involves the avoidance of control gyro torque components of this type. The possible sources, in the control gyro, for such torque components can be divided into three main categories:

(A) Rotor acceleration and deceleration torques entering the control gyro axes through cross-coupling effects (B) Thermal unbalance torques which develop from the periodically varying power input to the control gyro spin motor (C) Rotor shift torques which are the result of unsymmetrics and axial rotor forces of the control gyro.

If the control gyro is so constructed as to eliminate any case where the total torque $\Sigma T_1 = T_1 - T_c$ acting on the control gyro is proportional to the angular momentum of the control gyro, then $$\Sigma T_1 = K_0 H_1(t) = K_0 \frac{H_0}{f(t)}$$

and since the processing circuitry suppresses any response to a constant input, elimination of any major effects from the reference gyro on the torque computation and satisfactory separation of the torque of the control gyro from that of the reference gyro can be accomplished.

Figure 7:
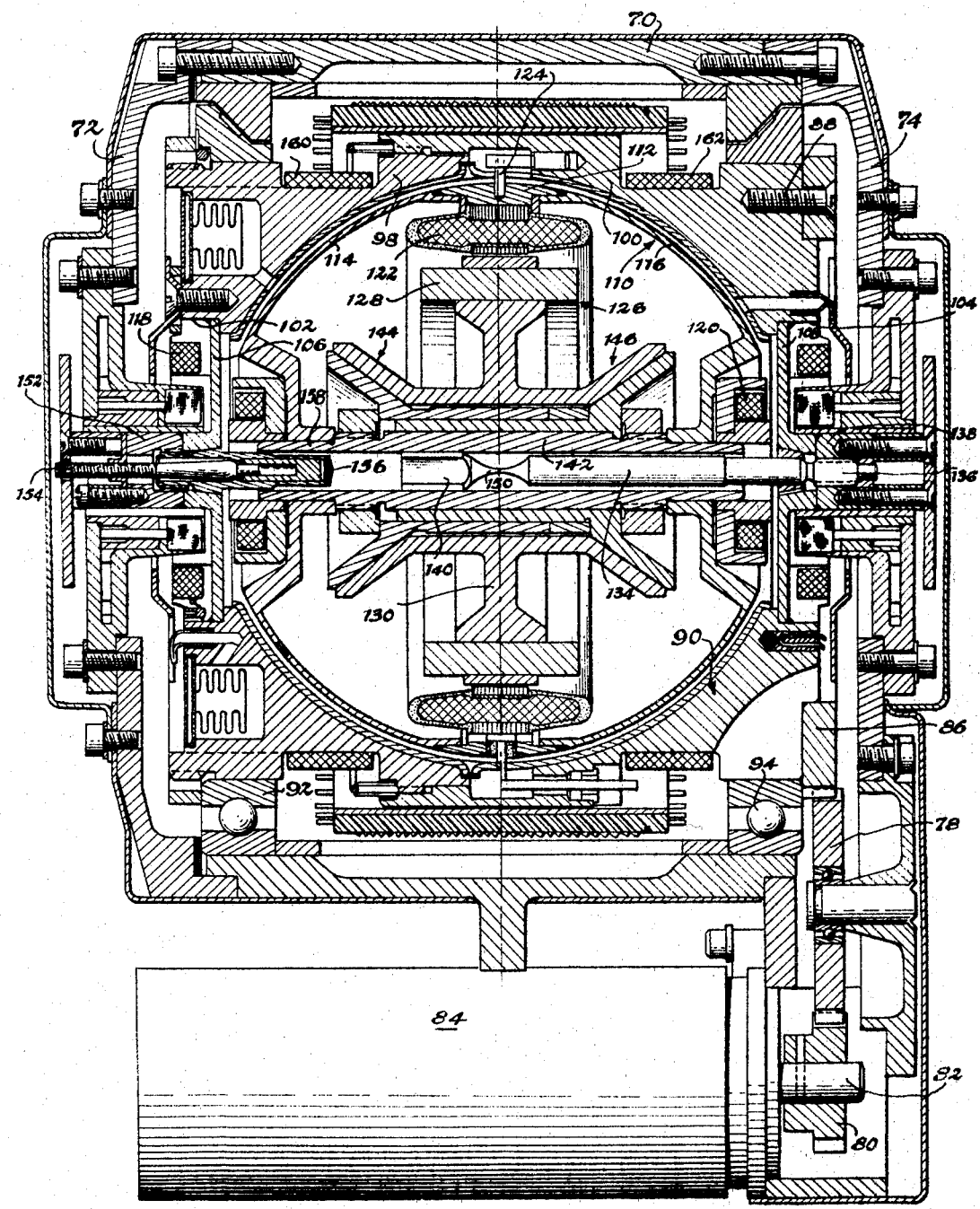
FIG. 7 is a sectional view taken through a control gyro constructed for use in conjunction with the present invention.

To eliminate, in the control gyro, the possible sources A, B or C enumerated above, the control gyro is preferably constructed in accord with the structure illustrated in FIG. 7. This structure represents a two-degree-of-freedom floated gyro using case rotation and is similar in most respects to the gyro disclosed in copending application Ser. No. 861,140 filed Dec. 21, 1959, and now U.S. Patent No. 3,176,524, except that the structure of FIG. 7 utilizes hydrodynamic gas bearings for the rotor. With this type of gyro, angular momentum-proportional torques are successfully avoided as pointed out hereinbelow.

*A.—Rotor torque cross-coupling components*

The rotor acceleration torques are associated with a control gyro spin motor torque vector which is not quite perpendicular to the plane of the gyro output axes. By using the case rotation principle, this cross-coupling component appears as a modulation frequency of the case rotation frequency and, as such, it is at much too high a frequency to have any detrimental effect on the gyro compensation torque $T_c$.

*B.—Thermal unbalance torques*

Thermal unbalance torques may develop due to asymmetrical distribution of the spin motor heat which shifts the center of buoyancy of the floated gyro periodically back and forth along the spin axis. The effective temperature changes on the surface of the gyroscopic float are created by the process of heat dissipation and conduction from the spin motor towards both ends of the spin axis. This process involves a time delay which appears as a negative phase shift for periodic changes of the motor heat input and, from theoretical approximations confirmed by test results, this phase shift is approximately proportional to the square root of the frequency involved. Practical measurements indicate that at a frequency of approximately 60 radians per hour, the phase shift amounts to $-90$ degrees. Also, the attenuation of these periodic changes depends on the frequency so that the damping is approximately proportional to the square root of the frequency. As a result, the thermal torque effects that cannot be compensated by the modulation circuitry according to the present invention are in the order of less than $3 \times 10^{-5}$ degrees per hour.

*C.—Rotor shift torques*

It has been determined that the utilization of ball bearing supports for the rotor permits the development of rotor shift torques which vary linearly with rotor speed and, consequently, the utilization of such bearings is undesirable. It has been found, however, that a hydrodynamic gas bearing may be made to exhibit a non-linear response and it is for this reason that this type of bearing is utilized, as is shown in FIG. 7, hereinafter more particularly described. Specifically, it was determined that a conical hydrodynamic gas bearing with a cone angle of approximately 40 degrees produces no rotor shift torque which contains a term or terms proportional to the angular rate of the bearing, so that the case of a constant drift rate of the controlling and modulated gyro is avoided.

With reference now more particularly to FIG. 7, a preferred form of control gyro is illustrated therein. The gyroscope illustrated is a two-degrees-of-freedom gyro and will be seen to include the main housing comprised, in this particular case, with a cylindrical main body portion 70 provided with the end cap members 72 and 74. The main housing is provided with a gear case extension 76 mounting an idler gear 78 driven by a pinion 80 rigid with the axle 82 of a drive motor 84 mounted rigidly on the main housing in any suitable fashion. The idler gear 78 is in mesh with a ring gear member 86 rigidly mounted, as by fasteners 88, to a rotor case assembly indicated generally by the reference character 90. The rotor case 90 is journalled within the main housing of the assembly by means of suitable ball bearings 92 and 94 and it will be appreciated that the rotor case is rotated, by the motor 84, for purposes which will be presently apparent. The rotor case, as shown, includes the separably joined sections 98 and 100 having diametrically opposed open end portions 102 and 104 closed by the plate members 106 and 108. In this fashion, the rotating frame 90 is rendered fluid tight and a suitable floatation fluid is disposed therewithin for floating the rotor case assembly indicated generally by the reference character 110. The rotor case 110 is generally hemispherically shaped and may include the equatorial ring member 112 joining the two shell members or portions 114 and 116 which carry, in diametrically opposed relationship, the excitation coil assemblies 118 and 120, substantially as is shown. Mounted interiorly on the ring 112 is a conventional hysteresis motor stator assembly 122 which is provided with suitable flexible leads 124 extending to a suitable external source of power, as is well understood and conventional in this art. The stator assembly 122 is effective to drive the gyroscope rotor assembly indicated generally by the reference character 126 which, as shown, may include the cylindrical main body portion 128 rigid with the hub assembly 130. The rotor assembly 126 is connected to and freely suspended from the rotor case assembly 110 by means of a suspension bar member 134 which has one end 136 thereof firmly gripped by a chuck assembly 138 carried by the end plate member 108 and the opposite end 140 of this suspension bar or shaft is rigidly fixed to an axle member 142 rigid at its opposite ends with the rotor case 110 and upon which the rotor assembly 126 is rotatably mounted by means of the hydrodynamic gas bearings indicated generally by reference characters 144 and 146. The pivot bar 134 is provided with a necked down portion 150 which is so disposed as to provide an elastic pivot point substantially coinciding with the center of mass of the rotor case and rotor assembly. The end plate 106 of the main frame carries a suitable chuck or adjustment assembly 152 adjustably mounting a bar member 154 which carries, at its end, a permanent magnet member 156 which is disposed, with clearance, within the surrounding portion 158 of the axle 142, substantially as is shown.

In addition to the above, heater coils 160 and 162 are provided on the rotating frame 90 so as to permit differential temperature control to provide the requisite average temperature and temperature gradient along the spin axis of the gyro for the floatation fluid.

The above noted construction of the gyro shown in FIG. 7 is substantially identical with that described in conjunction with copending application Ser. No. 44,226 filed July 20, 1960, with the exception of the hydrodynamic gas bearings 144 and 146 which, in this particular instance, are utilized to provide nonlinearity in rotor axial shift effects with respect to rotor speed as modulated as set forth hereinabove. The gyroscope of FIG. 7 basically includes the main housing containing the frame assembly 90 which is slowly rotated and which encloses the rotor case assembly 110, in turn enclosing the rotor assembly 126. The rotor case 110 is connected to the frame 90 by means of the bar 134 (at pivot point 150) and the gyroscope operates, in general, on the principle of slowly rotating a universally mounted gyroscope about an axis parallel to the spin axis of the gyroscope whereby drift-inducing torques acting on the stable element of the gyroscope will be sinusoidally modulated during and as a result of such rotation. In order to maintain constant magnitudes of such torque during each period of rotation, so that they will average to zero, the gyroscope utilizes a particular suspension system as set forth hereinabove and, in addition, utilizes a magnetic shielding system. By these means, a major portion of the drift-inducing torques may be made to average to zero so that material reduction in the random drift rate of the gyroscope may be achieved solely by the construction as is shown in FIG. 7, aside from the further reduction of random drift rate achieved by the modulation and associated circuitry according to the present invention. The magnetic shielding encloses both the rotated frame 90 and the main housing of the assembly, all as is set forth and defined in conjunction with the aforementioned application.

In the suspension system, three effects are utilized: (1) the average temperature of the flotation fluid; (2) the temperature gradient along the spin axis; (3) the balancing of positive and negative restoring forces. The average temperature of the flotation fluid may be varied to deliberately introduce an isoelastic suspension forces compensatory for acceleration effects. These acceleration effects may be predicted for any particular problem and reproduced or simulated at bench tests, and the requisite average temperature rate of change programmed. The temperature gradient along the spin axis is used to make final corrections for float balancing errors and will be, in any case, only a fine adjustment. In considering the balancing of restoring forces, it will be realized that the shaft 134, when deflected, will impart a positive restoring force to the gyroscope relative to the frame 90, as will the necessary flexible leads to the terminals 124 when such deflection takes place. Moreover, it will be realized that these restoring forces will be constantly varying as the gyroscope assembly is rotated. The magnet 156 is so adjusted that its negative restoring force will constantly balance these positive restoring forces and therefore cancel them out so that, as aforesaid, the suspension system is isoelastic and, as a result, any drift-inducing torques on the stable element will be constant during each period of rotation of the frame 90 and the gyroscope assembly so that these torques will average to zero.

Figure 8:
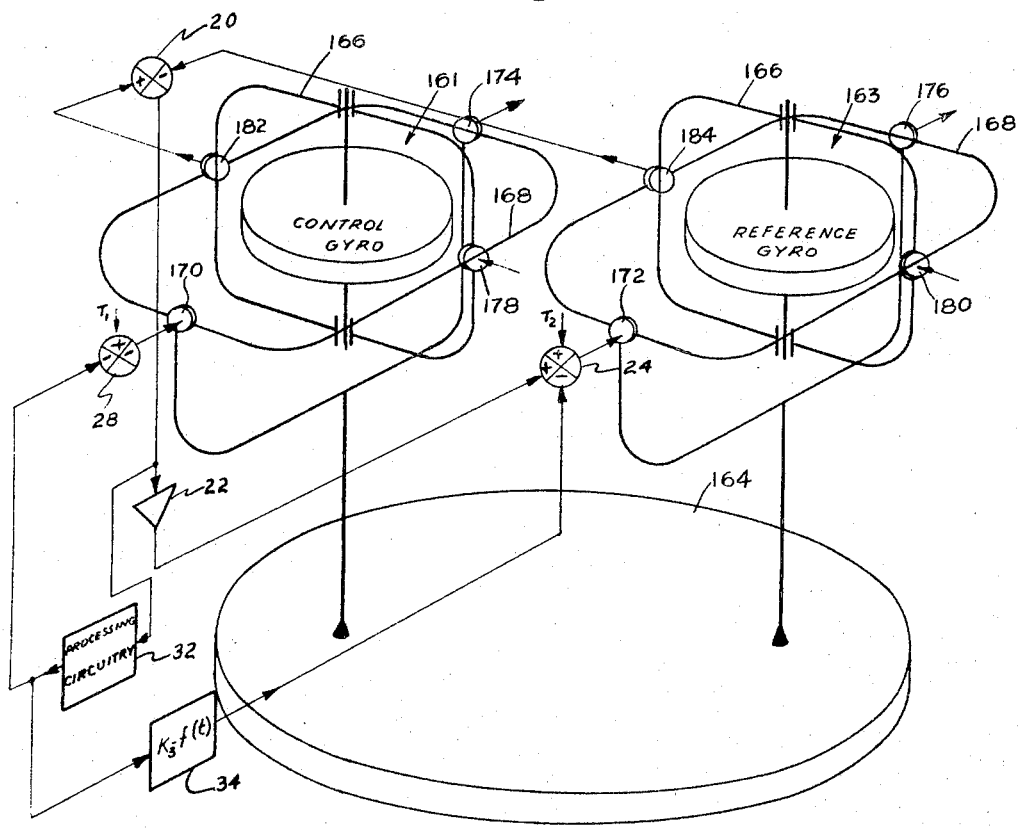
FIG. 8 is a diagrammatic view illustrating control and reference gyros acting in accord with the present invention as mounted on a stable platform.

The diagram of FIG. 8 illustrates the manner of relating the control gyro 161 to the reference gyro 163, both of which are mounted on the platform 164. Each gyro is provided with inner and outer gimbals 166 and 168 and in the particular configuration shown, the spin axes are disposed vertically. The two gyros are provided with X-axis torquers 170 and 172 and X-axis pick-offs 174 and 176 as well as Y-axis torquers 178 and 180 and Y-axis pick-offs 182 and 184, the designations X and Y being used to indicate the orthogonal relation between these two axes. With the arrangement shown, stabilization about the X-axis is achieved and for this purpose, the signals from the Y-axis pick-offs 182 and 184 are algebraically summed at 20 and applied to the amplifier 22 and to the processing circuitry 32, as in FIGS. 1 and 3. Likewise, FIG. 8 corresponds to FIGS. 1 and 3 in that the signals from the algebraic summing points 24 and 28 are applied to the X-axis torquers of the respective gyros. Thus, FIG. 8 provides a physical embodiment of the systems illustrated in FIGS. 1 and 3 and which are effective to achieve stabilization about one axis, in this case the X-axis.

It is to be understood that certain changes and modifications as illustrated and described may be made without departing from the spirit of the invention or the scope of the following claims.

I claim:
1. In an inertial navigation system,
a control gyro having a rotor,
a platform slaved to said control gyro,
torquer means coupled to said control gyro for opposing the effect of drift torque which may be acting upon said control gyro to impart precession to said platform,
means for periodically varying the angular momentum of the rotor of said control gyro,
a reference gyro mounted on said platform, said reference gyro having a rotor and having torquer means and pick-off means coupled thereto,
means for driving the rotor of said reference gyro at constant angular velocity,
amplifier means connected between said pick-off means and said torquer means of the reference gyro to slave said reference gyro in the average to the orientation of said control gyro,
processing circuit means connected between said pick-off means and the torquer means of said control gyro to compensate drift torque which may be acting on said control gyro,
and feedback means connected between the output of said processing circuit means and the torquer means of said reference gyro and operating on such torquer means in a sense opposite to that of said amplifier means.

2. The inertial navigation system according to claim 1 wherein the angular momentum of said control gyro is varied in accord with a triangular waveform.

3. In an inertial navigation system, in combination,
a platform,
means for stabilizing said platform including a control gyro, said control gyro having a rotor and being mounted on said platform for movement relative thereto about pick-off and torquing axes mutually perpendicular to each other and to the spin axis of said rotor, pick-off means associated with said pick-off axis and having an output indicative of the precession about such pick-off axis, torquer means associated with said torquing axis for exerting torque to said control gyro about its torquing axis,
a reference gyro having a rotor and being mounted on said platform for movement relative thereto about pick-off and torquing axes mutually perpendicular to each other and to the spin axis of the reference gyro rotor, pick-off means associated with the pick-off axis of the reference gyro and having an output indicative of the precession of the reference gyro about its pick-off axis, torquer means associated with the torquing axis of said reference gyro for exerting torque to said reference gyro about its torquing axis,
the spin and pick-off axes of said control and reference gyros being substantially parallel, amplifier means connecting the pick-off means of said reference gyro to the torquer means of said reference gyro so that the reference gyro is slaved in the average to said control gyro,
processing circuit means connecting the pick-off means of said reference gyro to the torquer means of said control gyro,
and feedback amplifier means connecting the output of said processing circuit means to the torquer means of said reference gyro.
and operating on such torquer means in a sense opposite to that of the first mentioned amplifier means.

4. In an inertial navigation system, in combination,
a platform having a pair of gyros mounted thereon, each of which includes a rotating mass and in which the output axes of said gyros are disposed in parallelism,
one of said gyros being connected to stabilize said platform and having means for periodically varying the angular momentum of its rotating mass and having torquer means for compensating drift torque which may be acting thereon, the rotating mass of the other gyro being driven at a constant angular velocity and having torquer means,
detecting means for determining the difference in precession angles of said gyroscopes,
amplifier means connecting the output of said detector means to said torquer means of the other gyro to slave the same, in the average, to the orientation of said one gyro,
processing circuit means connected between the output of said detector means and the torquer means of said one gyro, said processing circuit means having three sections; the first of which has an output $\epsilon_1$ and a transfer function $$\left(1+\frac{H_0}{K_1}P\right)$$

the second of which has an output $$\epsilon_2 = \frac{1}{f}\left(\dot{\epsilon}_1 + \frac{f}{f}\epsilon_1\right)$$

and the third of which has an output $\epsilon_3$ related to the output $\epsilon_2$ of the first section as follows:

$$\frac{f^2}{f^2}\ddot{\epsilon}_3 + K_2 g(\omega)\dot{\epsilon}_3 + 3\frac{\dot{f}}{f}\dot{\epsilon}_3 + \epsilon_3 = K_1 \epsilon_2$$

where:
$K_1$ = gain of the amplifier means
$K_2$ = constant
$H_0$ = angular momentum of the stated other gyro
$P$ = differential operator
$f$ = the modulation function by which the angular momentum of the stated one gyro is varied with respect to time $\dot{f}$ = first derivative, with respect to time, of $f$
$\dot{\epsilon}_1$; $\dot{\epsilon}_3$ = first derivative, with respect to time
$\ddot{\epsilon}_1$; $\ddot{\epsilon}_3$ = second derivative, with respect to time
$g(\omega)$ = frequency-dependent coefficient.

5. The system as defined in claim 1 wherein said feedback means time-modulates the output of said processing circuit means proportional to the time-modulation of the angular momentum of said control gyro.

6. In an inertial navigation system,
an attitude-controlling gyro having first and second output axes,
means for periodically varying the angular momentum said said attitude-controlling gyro,
an inertial platform slaved to said attitude-controlling gyro,
a reference gyro having first and second output axes parallel to the corresponding axes of said attitude-controlling gyro,
means for maintaining the angular momentum of said reference gyro constant,
means for sensing the difference $\epsilon$ between drift-induced angular errors of said first output axes,
amplifier means for torquing said reference gyro about its second output axis in proportion to $\epsilon$ to slave said reference gyro in the average to said attitude-controlling gyro,
processing circuit means for torquing said attitude-controlling gyro about its second output axis in proportion to $\epsilon$ to compensate drift-inducing torque acting about its second output axis,
and positive feedback means for torquing said reference gyro about its second output axis in proportion to the output of said processing circuit means and in a direction opposite to the torque applied by said amplifier means to assure a magnitude of $\epsilon$ sufficient for detection by said sensing means.

7. The system as defined in claim 6 wherein said feedback means time-modulates the output of said processing circuit means proportional to the time-modulation of the angular momentum of said attitude-controlling gyro.

8. In an inertial navigation system,
a control gyro having a rotor and mounted for two degrees of freedom about orthogonal axes perpendicular to the spin axis of said rotor, one of said orthogonal axes being an output axis,
a two-degree-of-freedom reference gyro having a rotor and mounted on a common support with said control gyro and having an output axis parallel with the output axis of said control gyro,
means for periodically varying the rotor speed of said control gyro to provide a varying angular momentum thereof having a triangular waveform of fixed frequency $\omega_1$,
pick-off means on the output axis of said reference gyro and torquer means on the other axis of said reference gyro,
amplifier means connected between said pick-off and torquer means to slave said reference gyro, in the average, to said control gyro,
said control gyro having torquer means on its other axis,
processing circuit means connecting said pick-off means of the reference gyro to the torquer means of said control gyro and including a first section eliminating significant phase shifts of $\omega_1$ and its multiples; a second section having an output $$\epsilon_2 = \frac{1}{f(t)}\left[\dot{\epsilon}_1 + \frac{f(t)}{f(t)}\ddot{\epsilon}_1\right]$$

where $\epsilon_1$ is the output of said first section, and $f(t)$ is the time-modulation function for the varying angular momentum of said control gyro; and a third section having an output $\epsilon_3$ related to the output $\epsilon_2$ by the following transfer function:

$$\frac{f(t)^2}{\ddot{f}(t)^2}\ddot{\epsilon}_3 + 3\frac{f(t)}{\dot{f}(t)}\dot{\epsilon}_3 + K_2 g(\omega)\dot{\epsilon}_3 + \epsilon_3 = K_1 \epsilon_2$$

where $K_1$ is the gain of said amplifier means $K_2 g(\omega)\dot{\epsilon}_3$ is a term effecting selective damping of the transfer function only in the immediate neighborhood of its natural frequency and time-modulated amplifier means connecting the output $\epsilon_3$ of said third section to the torquer means of said reference gyro.

9. In an inertial navigation system,
a two-degree-of-freedom control gyro having a rotor and a pair of output axes,
a two-degree-of-freedom reference gyro having a rotor and a pair of output axes,
means driving the rotor of said control gyro at variable speed to provide an angular momentum of such rotor which varies periodically according to a triangular waveform of fixed frequency,
means driving the rotor of said reference gyro at constant speed,
means slaving said reference gyro, in the average, to the orientation of said control gyro so that the output axes of the two gyros are parallel,
pick-off means connected with one output axis of said reference gyro,
torquer means connected with one output axis of said control gyro,
and processing circuit means connecting the output of said pick-off means to said torquer means, in which the processing circuit means is incapable of detecting torque components acting on said control gyro which are proportional to the modulation function of the varying angular momentum of the control gyro,
said control gyro including a housing, a frame journalled in said housing, a rotor case fluid suspended by said frame, means for rotating said frame about a fixed axis relative to said housing, a rotor disposed within said rotor case, means journalling said rotor in said rotor case to provide non-linear axial shifting thereof in response to variations of rotor speed, and means suspending said rotor case from said frame with the spin axis of the rotor coincidental with said fixed axis of rotation of said frame.

References Cited

UNITED STATES PATENTS

| | | | |
|---|---|---|---|
| 3,071,012 | 1/1963 | Baring-Gould | 74—5.34 |
| 3,075,393 | 1/1963 | Lindgren | 74—5.34 |
| 3,131,569 | 5/1964 | Gaye et al. | 74—5.34 |

C. J. HUSAR, *Primary Examiner.*

UNITED STATES PATENT OFFICE
CERTIFICATE OF CORRECTION

Patent No. 3,404,571                                    October 8, 1968

Helmut W. E. Schlitt

It is certified that error appears in the above identified patent and that said Letters Patent are hereby corrected as shown below:

Column 3, line 24, "$\beta_1$" should read -- $\dot{\delta}_1$ --; line 26, "$\dot{\delta}_1$" should read -- $\ddot{\delta}_1$ --. Column 4, line 52, "$H_0/H$" should read -- $H_0/M$ --. Column 6, line 3 the right-hand portion of equation (7) reading $$K_1 \dot{\epsilon}_2 \quad\quad \text{should read} \quad\quad K_1 \epsilon_2$$

line 74, "f(t)" should read -- $\ddot{f}(t)$ --. Column 7, line 42, "$\epsilon_3 K_2 g(w)$" should read -- $\dot{\epsilon}_3 K_2 g(w)$ --. Column 10, line 28, "isoelastic" should read -- anisoelastic --. Column 12, line 41, $$\epsilon_1 ; \epsilon_3 \quad\quad \text{should read} \quad\quad \ddot{\epsilon}_1 ; \ddot{\epsilon}_3$$

Signed and sealed this 10th day of March 1970.

(SEAL)
Attest:

EDWARD M. FLETCHER, JR.                              WILLIAM E. SCHUYLER, J
Attesting Officer                                              Commissioner of Patent